(12) United States Patent
Rapoport

(10) Patent No.: US 8,985,538 B2
(45) Date of Patent: Mar. 24, 2015

(54) FLEXIBLE SEGMENTED SUPPORT STRUCTURE

(76) Inventor: Uri Rapoport, Moshav Ben Shemen (IL)

( * ) Notice: Subject to any disclaimer, the term of this patent is extended or adjusted under 35 U.S.C. 154(b) by 75 days.

(21) Appl. No.: 13/202,772

(22) PCT Filed: Apr. 21, 2010

(86) PCT No.: PCT/IL2010/000316
§ 371 (c)(1),
(2), (4) Date: Oct. 31, 2011

(87) PCT Pub. No.: WO2010/122553
PCT Pub. Date: Oct. 28, 2010

(65) Prior Publication Data
US 2012/0037778 A1    Feb. 16, 2012

Related U.S. Application Data

(60) Provisional application No. 61/171,085, filed on Apr. 21, 2009.

(51) Int. Cl.
*A47F 5/00*        (2006.01)
*B62J 7/08*        (2006.01)

(52) U.S. Cl.
CPC .............. *B62J 7/08* (2013.01); *Y10S 248/912* (2013.01)
USPC ........ 248/309.1; 248/912; 248/305; 248/308; 248/682; 29/428

(58) Field of Classification Search
USPC ........... 248/309.1, 302, 305, 308, 311.2, 315, 248/316.8, 912, 682, 693, 74.3, 74.4, 230.4, 248/228.8, 160; 29/428, 525.01
See application file for complete search history.

(56) References Cited

U.S. PATENT DOCUMENTS

| 870,429   | A | * | 11/1907 | Grimier ........................ 248/160 |
| 2,759,765 | A | * | 8/1956  | Pawley ........................ 239/588 |
| 2,874,812 | A | * | 2/1959  | Clevett, Jr. .................... 52/223.7 |
| 3,695,617 | A | * | 10/1972 | Mogilner et al. ............. 273/156 |
| 4,037,978 | A | * | 7/1977  | Connelly ....................... 403/164 |
| 4,063,637 | A | * | 12/1977 | Danforth ........................... 206/8 |
| 4,352,362 | A | * | 10/1982 | Nichols .......................... 135/98 |
| 4,397,145 | A | * | 8/1983  | Reist ............................... 59/78 |
| 4,418,915 | A | * | 12/1983 | Calebs .......................... 273/159 |

(Continued)

OTHER PUBLICATIONS

International Search Report and Written Opinion dated Aug. 25, 2010 in corresponding International Application No. PCT/IL2010/000316.

*Primary Examiner* — Monica Millner
(74) *Attorney, Agent, or Firm* — The Law Office of Michael E. Kondoudis

(57) ABSTRACT

The present invention provides an elongated segmented binding cord (SBC) for reversibly housing and securing goods to their predetermined location; said SBC is characterized by a main longitudinal axis (MLA), comprising: a. a plurality of N interlockable segments; b. abutments provided at least one first end, and at least one second opposite end of the SBC; each of said abutments is adapted to at least reversibly attach said predetermined location; wherein by attaching said at least two abutments to their location, said SBC is reversibly transformed from at least two opposite states: LOOSE (non-arched) configuration and a TIGHTENED (arched) configuration, such that said goods are at least partially housed in a secured manner within the arched SBC.

4 Claims, 12 Drawing Sheets

(56) References Cited

U.S. PATENT DOCUMENTS

| | | | | |
|---|---|---|---|---|
| 4,583,956 | A * | 4/1986 | Nelson | 446/119 |
| 4,675,916 | A * | 6/1987 | Orsini | 2/181 |
| 4,675,948 | A * | 6/1987 | Bengtsson | 24/115 G |
| 4,739,801 | A * | 4/1988 | Kimura et al. | 138/120 |
| 4,778,184 | A * | 10/1988 | Fleischer | 273/155 |
| 4,979,531 | A | 12/1990 | Toor et al. | |
| 4,986,457 | A * | 1/1991 | Faris | 223/1 |
| 4,997,375 | A * | 3/1991 | Heinz | 434/403 |
| 5,110,315 | A * | 5/1992 | Zawitz | 446/102 |
| 5,333,634 | A * | 8/1994 | Taylor | 135/98 |
| 5,423,341 | A * | 6/1995 | Brady | 135/139 |
| 5,435,024 | A * | 7/1995 | Capshaw | 5/417 |
| 5,449,206 | A * | 9/1995 | Lockwood | 285/261 |
| 5,489,075 | A * | 2/1996 | Ible | 248/104 |
| 5,525,089 | A * | 6/1996 | Heinz | 446/119 |
| 5,531,364 | A | 7/1996 | Buis | |
| 5,620,352 | A * | 4/1997 | Tzong | 446/120 |
| 5,697,128 | A * | 12/1997 | Peregrine | 24/115 G |
| 5,896,623 | A * | 4/1999 | Martin | 24/16 PB |
| 6,042,155 | A * | 3/2000 | Lockwood | 285/264 |
| 6,076,539 | A * | 6/2000 | Richardson | 135/20.1 |
| 6,126,237 | A * | 10/2000 | Ritterhouse | 297/397 |
| 6,241,572 | B1 * | 6/2001 | Braginsky | 446/85 |
| 6,606,765 | B2 * | 8/2003 | Edmondson | 24/265 CD |
| 6,626,210 | B2 * | 9/2003 | Luettgen et al. | 138/120 |
| 6,648,376 | B2 * | 11/2003 | Christianson | 285/146.1 |
| 6,748,962 | B2 * | 6/2004 | Miller | 135/130 |
| RE38,897 | E * | 11/2005 | Krenzel | 362/191 |
| 6,983,930 | B1 * | 1/2006 | La Mendola et al. | 269/45 |
| 7,174,584 | B2 * | 2/2007 | Danaher | 5/414 |
| 7,533,906 | B2 * | 5/2009 | Luettgen et al. | 285/146.1 |
| 7,549,432 | B2 * | 6/2009 | Sherts | 135/123 |
| 7,841,355 | B2 * | 11/2010 | Livacich et al. | 135/120.3 |
| 8,197,149 | B2 * | 6/2012 | Darrow | 396/428 |
| 8,251,536 | B2 * | 8/2012 | Bevirt | 362/190 |
| 8,753,360 | B2 * | 6/2014 | Gleiman et al. | 606/151 |
| 2003/0195619 | A1 * | 10/2003 | Cosgrove et al. | 623/2.11 |
| 2005/0082824 | A1 * | 4/2005 | Luettgen et al. | 285/146.1 |
| 2007/0154254 | A1 * | 7/2007 | Bevirt | 403/56 |
| 2007/0212163 | A1 * | 9/2007 | Bevirt | 403/56 |
| 2007/0283991 | A1 * | 12/2007 | Sherts | 135/90 |
| 2008/0006317 | A1 | 1/2008 | Livacich et al. | |

\* cited by examiner

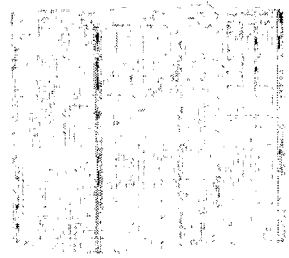
*Fig. 1e*
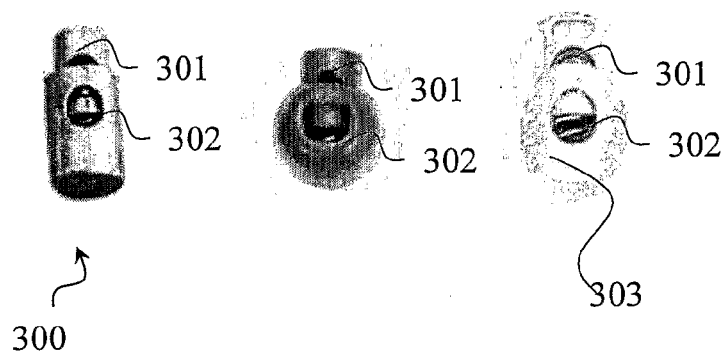
*Fig. 2 – Prior art*

US 8,985,538 B2

FLEXIBLE SEGMENTED SUPPORT STRUCTURE

FIELD OF THE INVENTION

The present invention relates to a method and device useful e.g., for securing goods upon a bicycle rack, for securing items in confined volumes etc.

BACKGROUND OF THE INVENTION

Flexible segmented structures are used to good effect for example in collapsible tent poles. A set of hollow generally tubular bodies are attached by means of ferrules, and are pulled together by means of an elastic cord running through the tubes.

For example, U.S. Pat. No. 4,979,531 provides a flexible, multi-segmented support structure particularly suited for use as a tent pole, wherein the support structure includes a plurality of tubular segments and each segment is connected to its adjacent segment or segments by lengths of elastic shock cord, the cord having sleeves affixed to each end thereof which can be affixed in partly or fully automated fashion to the respective segments. A novel ferrule is included to provide rigidity at the junctions of the segments, without providing undue stress concentration and to further assist in automating the manufacturing process.

While this device is as stated useful for tents and the like, it will be appreciated that the ferrules are not adapted to provide different attachment angles. Furthermore, a structure composed of such linear segments will not provide substantial crush protection or lateral support.

Therefore, there is still a long felt need for a structure that can reversibly house and secure objects to a predetermined location whilst maintaining predetermined amount of tension applied on the objects. Furthermore, there is still a long felt need for a structure that can reversibly house and secure objects whilst maintaining predetermined bending characteristics.

BRIEF DESCRIPTION OF THE DRAWINGS

In order to understand the invention and to see how it may be implemented in practice, a plurality of embodiments will now be described, by way of non-limiting example only, with reference to the accompanying drawings, in which:

FIGS. 1a-1e demonstrate various cord-like 1D, net-like 2D and case-like 3D structures of the SBC structure according to an embodiment of the present invention;

FIG. 2 present a set of commercially available cord locks from the prior art;

in FIG. 7b the ligament id positioned within the segment while in FIG. 7c the ligament is positioned externally to the segment;

SUMMARY OF THE INVENTION

Figure 1A:
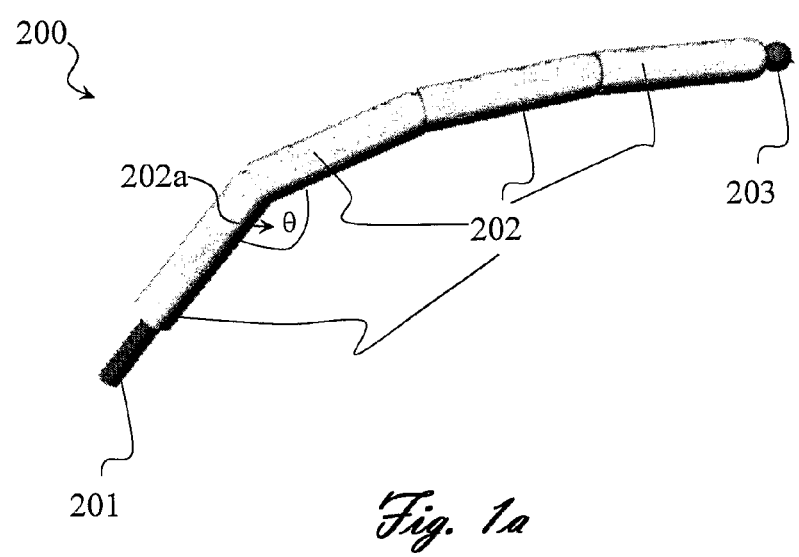

It is according to one object of the invention to disclose an elongated segmented binding cord (SBC) for reversibly housing and securing goods to their predetermined location. The SBC is characterized by at least one main longitudinal axis (MLA). The SBC comprises inter alia the following: a plurality of N interlockable segments, N is an integer equals to or higher than two; at least two abutments (also denoted hereinafter 'securing means'), provided at or adjustment to at least one first end, and at or adjutant to at least one second opposite end of the SBC. Each of the abutments is adapted to, at least reversibly, attach or otherwise affix a predetermined location. By attaching the at least two abutments to their location, the SBC is reversibly transformed from a LOOSE (non-arched) configuration to a TIGHTENED (arched) configuration and vice versa, such that the goods are at least partially housed in a secured manner to the location within the arched SBC.

It is according to yet another object of the invention to disclose the SBC as defined in any of the above; the SBC additionally comprises at least one ligament, provided along the MLA. The ligamented SBC inter alia comprises: (a) a plurality of N interlockable segments. The ligament is adapted to apply pressure upon the segments when it is shortened of tightened. (b) at least two abutments provided at least one first end of the SBC and at least one second and opposite end of the SBC. By shortening of otherwise tightening the ligament, a pressure is applied upon the segments, via the segments and abutments thereof, to the ground of the predetermined location. Hence, the SBC is reversibly transformed from its LOOSE (non-arched) configuration to its TIGHTENED (arched) configuration and vice versa. In this manner, the arched SBC housing the goods, or portions thereof, to their location, in a secured and effective manner.

It is according to another object of the invention to disclose the SBC as defined in any of the above, wherein the SBC is characterized by at least two subsequent segments which are respectively tilted in an angle θ; angle θ is adapted to provide the SBC with predetermined tighten arched characteristics.

It is according to yet another object of the invention to disclose the SBC as defined in any of the above, wherein the aforesaid ligament is made of materials being either flexible or rigid.

It is according to yet another object of the invention to disclose the SBC as defined in any of the above, wherein the ligament is positioned externally to at least one of the segments, and/or wherein the ligament is positioned internally, within and thought-out at least one of the segments.

It is according to yet another object of the invention to disclose the SBC as defined in any of the above, wherein the SBC additionally comprises ligament-shortening-means (LSM) useful for reversibly minimizing or otherwise shortening the effective distance between said segments and/or for shortening the effective length of the ligament.

It is according to yet another object of the invention to disclose the SBC as defined in any of the above, wherein the LSM is a ratchet-like mechanism, especially a mechanism located at one end of said SBC, adjacent to the SBC's abutments.

It is according to yet another object of the invention to disclose the SBC as defined in any of the above, wherein the SBC comprises at least one interlocking means adapted to connect $n^{th}$ segment of either (n−1) and/or (n+1) segments. The interlocking means are selected in a non-limiting manner from a group consisting of cord locks, male-female connecting means, magnetic means, hooks, ratchets, grapples, hooks-and-loops known as the commercially available Velcro™ product, snaps, buttons, screws, lanyards, magnets, snap hooks, and spring hooks, butt hinge, butterfly hinge, flush hinge, barrel hinge, ball-and-socket joints, continuous hinge, double action hinge, friction hinge, T-hinge, saddle hinge, uni-axial joint, bi-axial joint, tri-axial joint, or any combination thereof.

It is according to yet another object of the invention to disclose a cord-like SBC as defined in any of the above.

It is according to yet another object of the invention to disclose a net-like SBC structure. The SBCs of this structure comprises conjugating means adapted to interlock one SBC with at least one another SBC to form an array of multiple SBCs.

It is according to yet another object of the invention to disclose two dimensional collapsible mesh or net-like SBC structure. This 2D SBC structure comprises a plurality of M SBCs as defined in any of the above. M is an integer equal or higher 2.

It is according to yet another object of the invention to disclose a three dimensional collapsible shell or case-like SBC structure. This 3D SBC structure comprises a plurality of O SBCs as defined in any of the above. O is an integer equal or higher 3.

It is according to yet another object of the invention to disclose an SBC as defined in any of the above, wherein the SBC further comprises at least tubular ligament positioned in between an $n^{th}$ segment and at least one of its neighboring segments.

It is according to yet another object of the invention to disclose an SBC as defined above, wherein the tubular ligament is selected in a non-limiting manner from a group consisting of rubber-like O-ring member or a stack of the same, silicon at least partially circling said interlocking means or a stack of the same, a coil or spring-like member or any combination thereof.

It is according to yet another object of the invention to disclose an SBC as defined above, additionally comprises at least one ligament-securing means adapted to secure said ligaments to said SBC such that unthreading of said ligaments is prevented.

It is according to yet another object of the invention to disclose an SBC as defined above, wherein the conjugating means is selected in a non-limiting manner from a group consisting of cord locks, male-female connecting means, magnetic means, hooks, ratchets, grapples, hooks-and-loops known as the commercially available Velcro™ product, snaps, buttons, screws, lanyards, magnets, snap hooks, spring hooks, butt hinge, butterfly hinge, flush hinge, barrel hinge, ball-and-socket joints, continuous hinge, double action hinge, friction hinge, T-hinge, saddle hinge, uni-axial joint, bi-axial joint, tri-axial joint, or any combination thereof.

It is according to yet another object of the invention to disclose an SBC as defined above, wherein the ligament is rigid and is selected from a group consisting of polymeric materials, especially nylons, polyamides, plastics, composite materials, stainless steel, metal ware or a combination thereof.

It is according to yet another object of the invention to disclose an SBC as defined above, wherein the ligament is flexible and is selected from a group consisting of polymeric materials, plastics, rubbers and rubber-like materials, elastic materials, metallic springs or a combination thereof.

It is according to yet another object of the invention to disclose an article of manufacture comprising the 1D, 2D or 3d SBC structures as define above.

It is according to yet another object of the invention to disclose a method for reversibly housing and securing goods to a predetermined location. The method inter alia comprises steps of (a) providing the SBC with a main longitudinal axis (MLA); a plurality of N interlockable segments, N is an integer equals to or higher than two; and at least two abutments located at least one first end, and at least one second opposite end of the SBC; each of the abutments is adapted to at least reversibly attach-, or to be affix to the predetermined location; and, (b) attaching the at least two abutments to their location. By attaching the two or more abutments to their location, the SBC is reversibly transformed from its LOOSE (non-arched) configuration to its TIGHTENED (arched) configuration and vice versa, such that the goods are housed in a secured manner by and within the arched SBC.

It is according to yet another object of the invention to disclose the method as defined above, wherein the method further comprises steps of (a) providing the SBC with at least one ligament. The ligament is positioned along the SBC's MLA. (b) Applying pressure upon the segments. At least two abutments provided at or adjacent to at least one first end of the SBC and at or adjacent to as least one second and opposite end of the SBC. By providing the ligament to apply a pressure upon the segments, e.g., at their top portion, and via the segments and abutments thereof, to the ground of the predetermined location, the SBC is reversibly transformed from its LOOSE (non-arched) configuration to its TIGHTENED (arched) configuration and vice versa, such that the goods are housed in a secured manner within the arched SBC.

It is according to yet another object of the invention to disclose the method as defined above, wherein the method further comprises steps of interlocking $n^{th}$ segment to (a) the n+1 segment; or to (b) both n−1 and n+1 segments; threading a ligament through or along at least two of the segments; securing the SBC structure to the predetermined location by means of effectively affixing abutments to the location; and, shortening the ligament and thereby providing the ligament a predetermined amount of tension applied on said segments. By attaching the two abutments to their location, and shortening the ligament, the SBC is reversibly transformed from its LOOSE (non-arched) configuration to its TIGHTENED (arched) configuration and vice versa, such that the goods are housed in a secured manner within the arched SBC.

It is according to yet another object of the invention to disclose the method as defined above, wherein the method utilizes a two-dimensional SBC. The method inter alia comprises steps of: (a) providing a plurality of M SBCs; (b) for each of said M SBCs, interlocking $n^{th}$ segment to (i) the n+1 segment; or to (ii) both n−1 and n+1 segments; and threading a ligament through or along at least two of said segments; (c) conjugating at least one first SBC with at least one second SBC such as a 2D SBC net-like loose structure is obtained; (d) securing the loose 2D SBC structure to the predetermined location by means of effectively affixing abutments to the location; and, (e) shortening the ligaments and thereby providing the ligament with a predetermined amount of tension to be applied on the segments. By attaching the abutments to their location, and shortening the ligament, the 2D SBC is reversibly transformed from its LOOSE (non-arched) configuration to its TIGHTENED (arched) configuration and vice versa, such that the goods are housed in a secured manner within the arched 2D net-like SBC.

It is according to yet another object of the invention to disclose the method as defined above, for utilizing a three-dimensional SBC. The method inter alia comprises steps of: providing a plurality of M SBCs; for each of the M SBCs, interlocking $n^{th}$ segment to (i) the n+1 segment; or to (ii) both n−1 and n+1 segments; and threading a ligament through or along at least two of the N segments; conjugating at least one first SBC with at least one second SBC; and optionally with at least one third, forth etc SBC, such as a 3D SBC case-like loose structure is obtained; securing the loose 3D SBC structure to the predetermined location by means of effectively affixing abutments to said location; and, finally, shortening the ligaments and thereby providing the ligaments a predetermined amount of tension applied on the segments. By attaching the abutments to their location, and shortening the ligament, the 3D SBC is reversibly transformed from its LOOSE (non-arched) configuration to its TIGHTENED (arched) configuration and vice versa, such that the goods are housed in a secured manner within the arched 3D case-like SBC.

DETAILED DESCRIPTION OF PREFERRED EMBODIMENTS

The following description is provided, alongside all chapters of the present invention, so as to enable any person skilled in the art to make use of the invention and sets forth the best modes contemplated by the inventor of carrying out this invention. Various modifications, however, will remain apparent to those skilled in the art, since the generic principles of the present invention have been defined specifically to provide a flexible segmented support structure.

The term 'plurality' refers hereinafter to any non-zero integer and greater than 1, e.g., 2-10, 10-200 etc.

It is according to one embodiment of the invention, wherein an elongated segmented binding cord (SBC) for reversibly housing and securing goods to their predetermined location is disclosed. In analogy to arch-bridge, e.g., a Roman arch bridge, the SBC is constructed with abutments at each end shaped as a curved arch. Hence, the SBC work by transferring the weight of the SBC, its loads, or a loading externally provided on the SBC, partially into a horizontal thrust restrained by the abutments at either side. According to various embodiments of the invention, the SBC comprises several interconnected segments. The load at the top of the segments makes each segment on the arch of the SBC press on the one next to it. This happens until the push is applied to the end supports or abutments, which are embedded in the basis of the arch, and accordingly, the basis around the abutments is squeezed and pushes back on the abutments.

The SBC is characterized by a main longitudinal axis (MLA) along which at least one ligament is provided. The SBC comprised of a plurality of N interlockable segments, N is an integer equals to or higher than two. The SBC is adapted to be reversibly transformed from a LOOSE (non-arched) configuration to a TIGHTENED (arched) configuration and vice versa. In the loose configuration, there is no effective pressure upon the segments and the SBC is relatively flexible. In this configuration, there is an effective distance between the segments. In the tightened configuration, however, there is an effective pressure upon the segments and the SBC is relatively rigid. Here, the segments are very close to each other in a way that there isn't an effective distance between them.

The segments are shaped (e.g., and in a non-limiting manner, shaped by means of shape, size or a bending mechanism) to form ani arch with a preset characteristics upon applying the pressure. According to an embodiment of the invention, at least two neighboring segments are positioned in a manner that characterizes an angle θ of a preset range. Angle θ is adapted to provide the tightened SBC with predetermined arched characteristics. Angle θ may vary from segment to segment and is ranging e.g., form 0° to 180°. Hence, in order to maintain an arch-like rigid structure, angle 9 may approximately equal to 30° in an SBC of six segments, and similarly, angle 9 may equal 20° wherein N=9. Alternatively, still in a non-limiting manner, in order to maintain an shell-like rigid structure, angle 9 may approximately equal to 30° in an SBC of 12 segments, and similarly, angle 9 may equal 20° wherein N=18.

It is according to yet another embodiment of the invention, wherein at least one of the segments is provided with interlocking means adapted to connect an $n^{th}$ segment to (a) the $(n+1)^{th}$ segment; or to (b) both $(n-1)^{th}$ and $(n+1)^{th}$ segments. The initial distance between the segments is alterable such that the curvature of at least two of the segments along MLA is limited to a predetermined bending characteristics to arch the SBC, e.g., by means of curving the segments in angle θ, as defined above.

The term 'effective distance' refers to the applicable distance between an $n^{th}$ segment to (a) the $(n+1)^{th}$ segment; or to (b) both $(n-1)^{th}$ and $(n+1)^{th}$ segments which provides the SBC to be rigidly affixed in its tightened configuration. The distance may vary from e.g., few micrometers to a scale of e.g., millimeters, as function, for example, of the segments geometry, size and compositions.

As defined above, the SBC is constructed with abutments at each end shaped as a curved arch. It is according to another embodiment of the invention wherein at least the first segment in one end of the SBC and at least the first segment on the opposite end of the SBC are the abutments; being in physical connection with the location the SBC is to be secured.

The effective distance between the segments is reversibly alterable, for example by utilizing various means for shortening the effective length of the ligament, and minimizing the effective distance between the segments. One of those means are interlocking means, which are selected in a non-limiting manner from a group consisting of cord locks, male-female connecting means, magnetic means, hooks, ratchets, grapples, hooks-and-loops known as the commercially available Velcro™ product, snaps, buttons, screws, lanyards, magnets, snap hooks, and spring hooks, butt hinge, butterfly hinge, flush hinge, barrel hinge, ball-and-socket joints, continuous hinge, double action hinge, friction hinge, T-hinge, saddle hinge, uni-axial joint, bi-axial joint, tri-axial joint, or any combination thereof. Hence for example, a ratchet, hand tool or automated tool containing a toothed wheel that can only move in one direction is used for (z) shortening the ligament or otherwise reducing the effective distance between the segments and/or (ii) affixing the ligament length and the effective distance at the time the SBC is used.

It is according to another embodiment of the invention, wherein the SBC is provided in its tightened (arched) configuration when one or more (e.g., both sides of the elongated SBC) portions of the SBC are immobilized or otherwise connected to a predetermined location, surface or carrying device. When well anchored to the surface, the ligamented segments maintain a predetermined amount of tension applied on the goods clasped by the SBC and hence securing the goods to their location.

Reference is made now to FIG. 1a which illustrates in an out-of-scale manner one general embodiment of an elongated segmented binding cord (SBC) 200 according to the present invention. SBC 200 is characterized by a main longitudinal axis (MLA) along which at least one ligament 201 is provided. SBC 200 comprises of a plurality of N interlocked segments 202, in which N is an integer equal or higher than two, here N equals 4. FIG. 1a discloses an SBC where ligament 201 is accommodated within each of segments 202. It is well in the scope of the invention wherein ligament 202 is provided externally to the segments, as will be shown downwards e.g., in FIG. 5, FIG. 7c, FIGS. 8a-h, FIG. 9a-b, FIG. 10 etc.

According to the embodiment presented in FIG. 1a, each two neighboring segments 202 are characterized by angle θ 202a. Angle θ is adapted to provide the SBC with predetermined bending characteristics to form a rigid arch-structure.

According to one embodiment, ligament 201 is flexible and tends to draw all members 202 together while maintaining constant tension. Flexible ligament is made e.g., by rubber-like materials, or consists of spring-like configurations. According to alternative embodiment, ligament 201 is at least partially rigid, i.e., non-flexible and tends to draw all segments 202 together when shorten. Non-flexible ligament is made e.g., by polymeric materials, Nylons of other polyamides etc., or stainless steel etc.

Still referring FIG. 1a, a set of four tubular segments is shown. In this embodiment, the connection between each two segments 202 is provided by interlocking means, which according to an embodiment of the invention, can be based upon a ball-and-socket joint, allowing for universal (yet limited one) rotation of each segment with respect to its neighbor.

According to an alternative embodiment of the present invention, the end of the flexible ligament is kept from slipping through the segments 202 by means of a flexible ligaments-securing means 203. The ligaments-securing means 203 are adapted to secure the ligaments to the SBC such that unthreading of the flexible ligaments is obtained.

According to an embodiment of the present invention, the SBC is used for reversibly housing and securing goods to a predetermined location. An example of use is to attach and protect objects upon a car roof or a bicycle basket. According to that embodiment, the SBC additionally comprises at least one fastening-securing means (see e.g., FIG. 11a-b and FIG. 12) for fastening the SBC to the predetermined location.

Figure 1B:
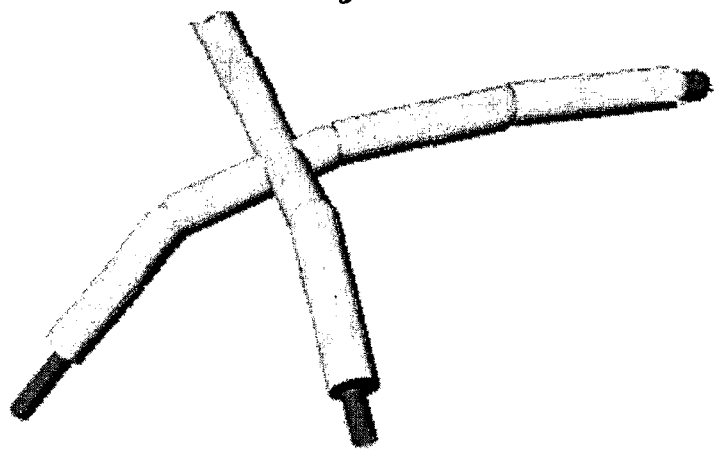

Reference is now made to FIG. 1b disclosing in an out-of-scale manner a conjugate comprises of two SBCs. By attaching several such SBC 200 together, a mesh or web can be formed as seen in FIGS. 1c and 1d.

Figure 1C:
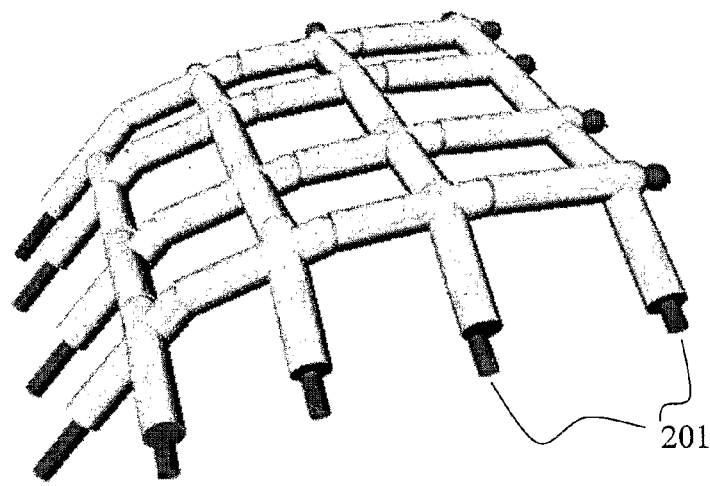
Figure 1D:
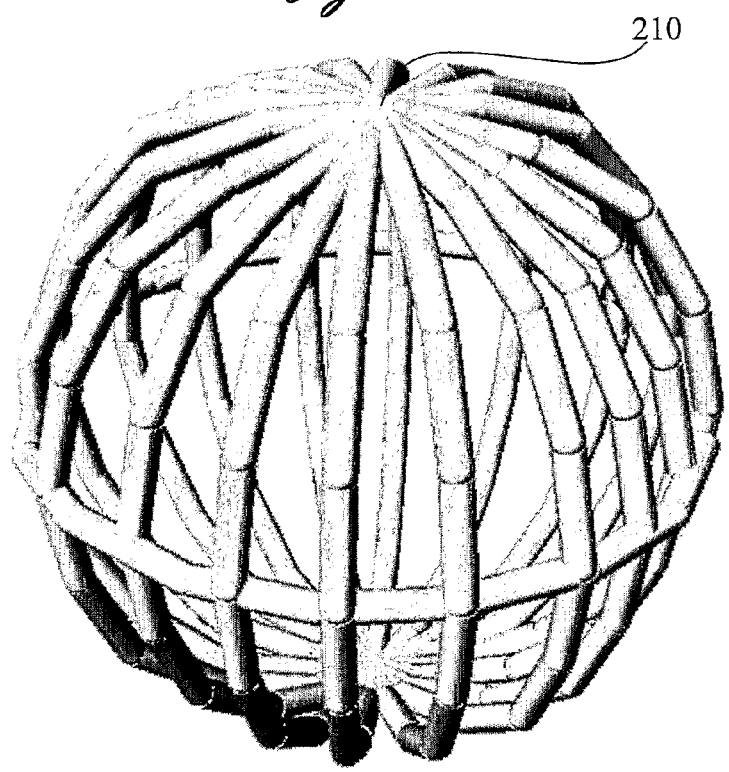

FIG. 1c illustrates a two-dimension (2D) or three-dimension (3D) network which comprises a plurality of SBCs. This article of manufacture can be used, for example, to attach and protect objects upon a car roof or a bicycle basket. In these cases, the mesh forms a surface that mates with a pre-existing surface such as the roof of a car in order to enclose objects in the volume between the two surfaces. FIG. 1d illustrates a 3D shell, basket, container, suitcase or the like, which comprises inter alia a plurality of conjugated or either directly- or indirectly-connected SBCs. The 2D structure may comprise, according to the shown embodiment, a plurality of abutments connecting the SBC to the ground and facilitating the tight arch-like fastened structure. The 3D structure may comprise, according to the shown embodiment, a plurality of interconnected abutments, facilitating the tight sphere-like fastened structure. The shape of sphere may be regular or irregular, ball-like (See FIG. 1d), box-like (See FIG. 1e) or a combination thereof.

Alternatively, a single cord-lock (ligament fastener) can be utilized, while the other end is kept under a variable tension by means of a movable holding member such as a spring-loaded clamp or cord-lock, as may be familiar to users of clothing with drawstrings or sleeping bags with similar drawstrings, these often being provided with spring-loaded clamps. Examples of such commercially available cord locks 300 are shown in FIG. 2. These generally consist of coaxial bodies, the inner of which 301 can slide within the outer 302. The inner and outer bodies are provided with holes through which a cord is threaded. The inner body is pushed out of the outer body by means of a spring 303, which causes the cord to become clamped between the holes of the outer and inner bodies. Obviously a great number of variations on this means for clamping the elastic member securely are possible, including but not limited to screws, spring-loaded clamps, ratchets, Velcro™, and the like as will be obvious to one skilled in the art. If the tensioning member takes the form of an elastic band, amongst others, and the end-cap used is a cord-lock device as described above, the tension on the net will be released when the elastic band is released from under tension.

According to another embodiment of the present invention, the flexible ligament is not threaded through the segment, but coupled to each segment, preferably upon the interlocking means.

According to that embodiment, each segment 202 of the SBC is provided with interlocking means 204 adapted to connect an n segment to (a) the n+1 segment; or to (b) both n−1 and n+1 segments. Each of the interlocking means is provided with at least one flexible or rigid ligament coupled to it.

As described above, each two neighboring segments are characterized by an angle θ. Angle θ together with the ligament are adapted to provide the SBC with predetermined bending characteristics so as to form an arch secure structure when the SBC is tightened. Furthermore, as described above, the segments maintain a predetermined amount of tension applied on goods housed within the SBC and hence securable accommodating the goods within a tightened structure.

Figure 3A:
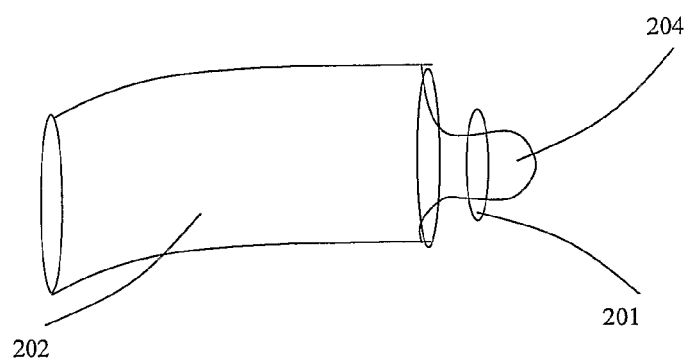
FIGS. 3a-3b demonstrate another embodiment of the segments 202 of the SBC.
Figure 3B:
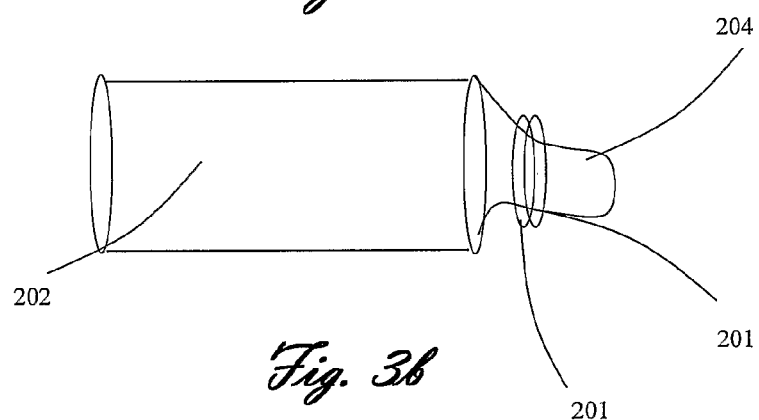

Such an embodiment is illustrated in FIG. 3a. Each segment 202, as mentioned above, contains interlocking means 204 (which in FIG. 3a are a ball and socket joint) upon which at least one flexible ligament 201 is coupled. FIG. 3a illustrates one flexible O-ring-type ligament 201 and FIG. 3b illustrates an embodiment at which two flexible O-ring-type or coil-type ligaments 201 are used. In FIG. 3a, the body of the segment is curved, so that the SBC will arch at its tightened configuration. In FIG. 3b, however, the body of the segment is not curved; while coupling member 204 is curved or otherwise tilted in respect to the segment's MLA.

According to one embodiment of the present invention, flexible ligament 201 can be O-ring, Silicon member, coil, or other flexible, compressible or foamy material, at least partially circling the coupling means.

The embodiment described above can be used, for example, to attach and protect objects upon a car roof or a bicycle basket. In these cases, the mesh forms a surface that mates with a pre-existing surface such as the roof of a car in order to enclose objects in the volume between the two surfaces.

Figure 4A:
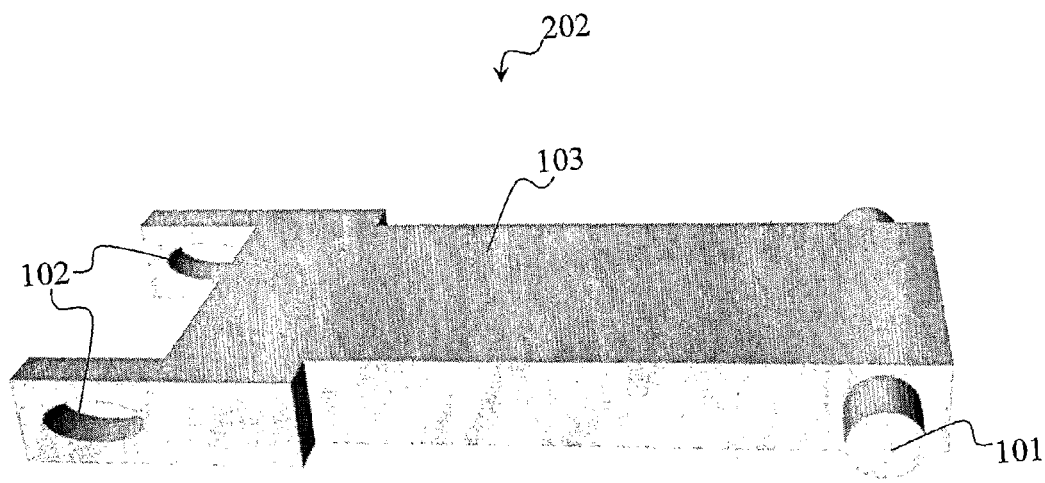
FIGS. 4a-4c demonstrate possible 1D-3D embodiments of the SBC provided by the present invention.

Reference is now made to FIGS. 4a-4d demonstrate another embodiment of the segments 202 of the SBC structure. As can be seen in FIG. 4a, the single interlocked segment is provided with a rigid body 103, a pin 101 and elliptic pin holders 102. The pin holders are formed as part of the body 103 and are adapted to hold a pin 101 of an adjacent segment while allowing rotation around the longitudinal axis of the pin whilst facilitating the tightened configuration of the SBC.

Figure 4B:
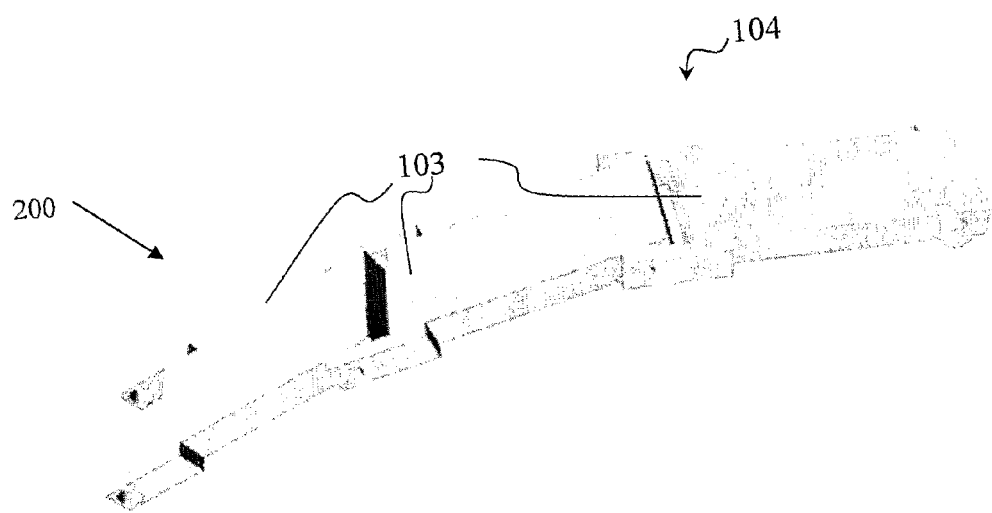

FIG. 4b illustrates the elongated segmented binding cord (SBC) 200 which comprises several such segments coupled together. In the figure the segments are slightly rotated with respect to one another. This arrangement is mechanically akin to that of a bicycle chain. Certain modifications of this device greatly amplify its usefulness. First of all, provision can be made to limit the angular travel available to one segment with respect to its neighbor.

Once an $n^{th}$ segment comes into contact with n-$1^{th}$ segment, it will not rotate further, and its rotational travel is therefore limited to a degree determined simply by the geometry of the segments. In other words, each two neighboring segments are characterized by an angle $\theta$. The angle $\theta$ is adapted to provide the entire structure with predetermined bending characteristics such that the curvature of at least a portion of the segments along the MLA is limited. This well-secured tighten configuration is provided by means of ligament (not shown) which applies a pressure upon the segments and ensure the arch-structure of the SBC.

Figure 4C:
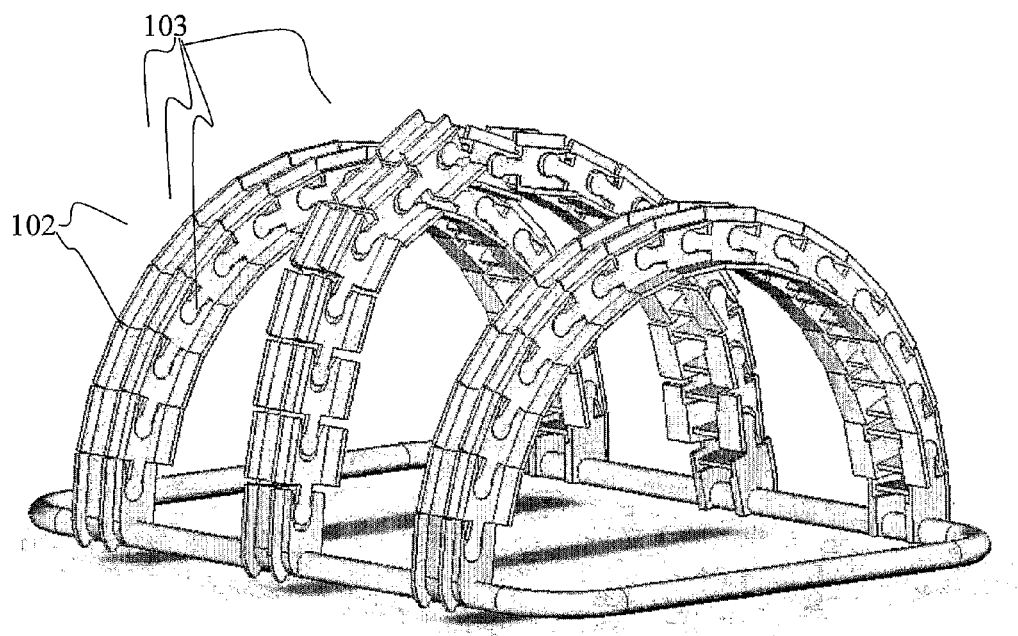

FIG. 4c illustrates a set of three 3D arched SBCs. The tightened ligament provided on the top portion of the segments is not shown.

Figure 5:
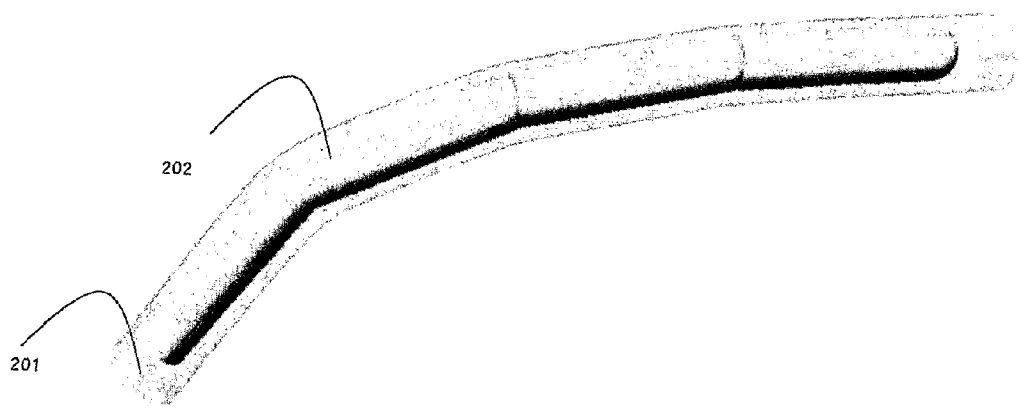
FIG. 5 demonstrates another SBC (i.e., a ligamenting lumen located at the outer surface of the segments) according to another embodiment of the present invention.

Reference is now made to FIG. 5, illustrating another embodiment of the present invention in which the ligament 201 is provided externally to segments 202. As an example and in a non-limiting manner, a shortenable flexible lumen can be use.

Figure 6A:
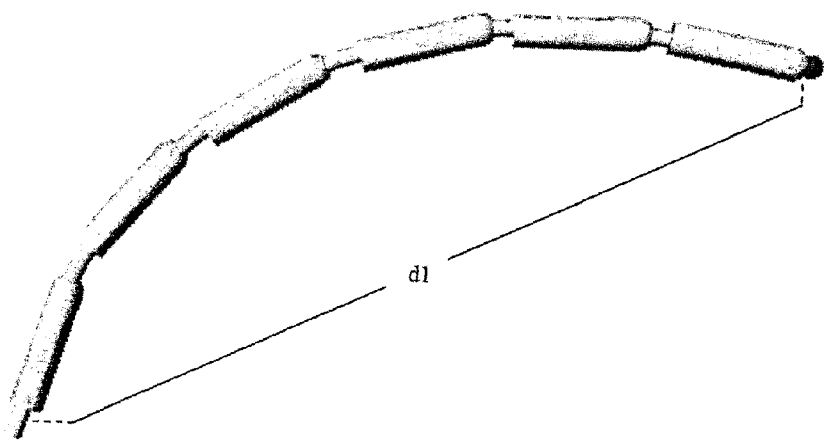
FIGS. 6a-6b demonstrate an SBC according to another embodiment of the present invention.
Figure 6B:
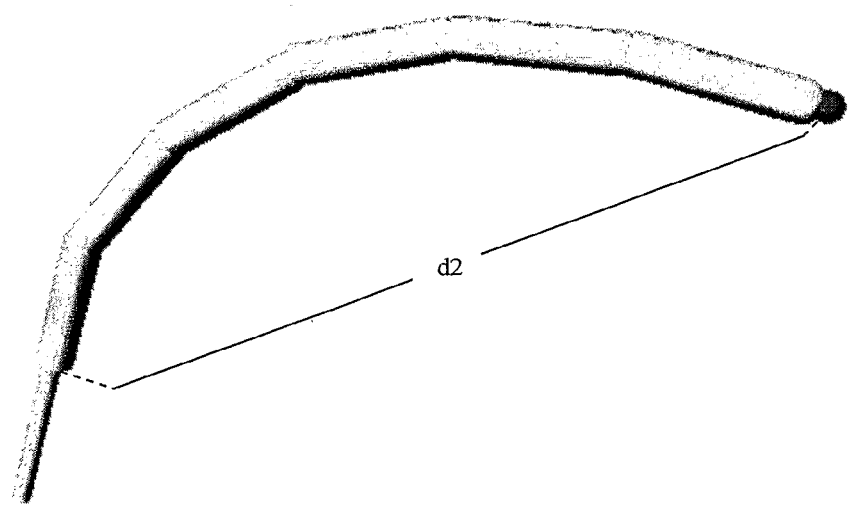
Figure 7A:
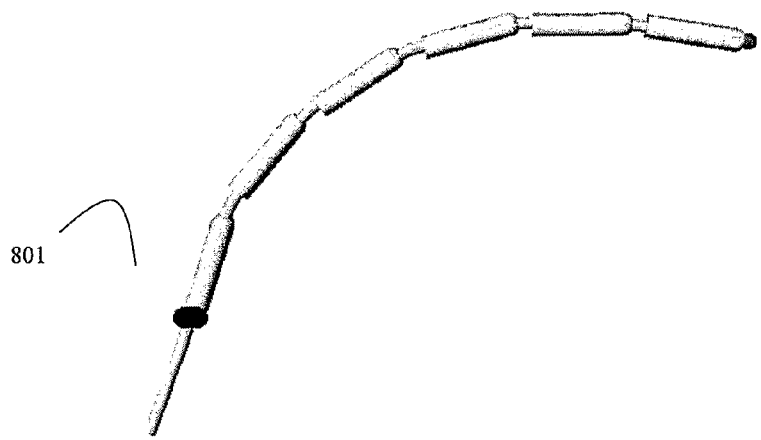
FIGS. 7a-7c demonstrate an SBC according to another embodiment of the present invention.
Figure 7B:
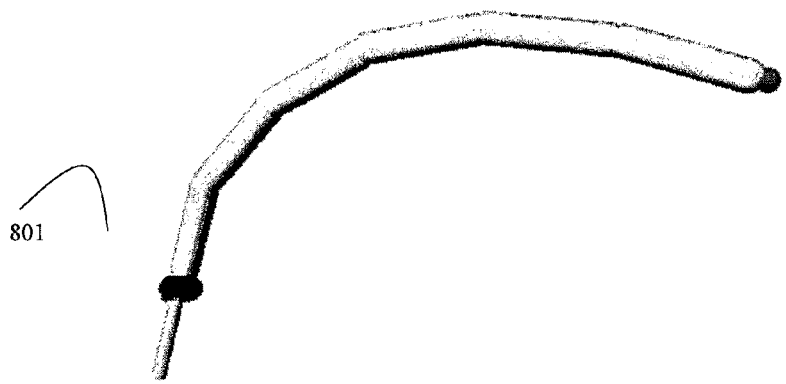
Figure 7C:
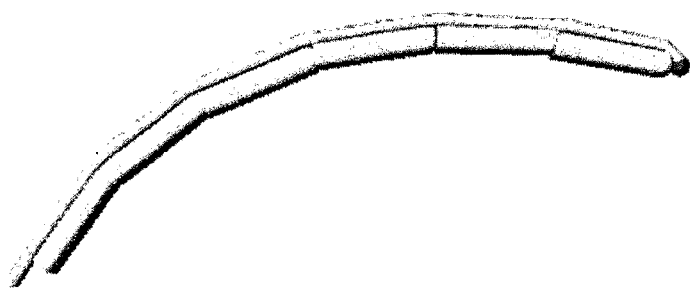

Reference is now made to FIGS. 6a,b-7a,b, illustrating another embodiment of the present invention in which the ligament is either flexible or rigid. In FIG. 6a the segments are characterized by an initial distance $d_1$ (i.e., loosened configuration). By shortening said distance via the securing means (e.g., spring-loaded clamps or cord-locks) to a distance $d_2$ (FIG. 6b) the segments curve according to predetermined bending characteristics. FIGS. 7a,b presents the same, wherein the SBC comprises a cord-lock 801 (ligament fastener) as described in FIG. 2.

Figures 8A, 8B:
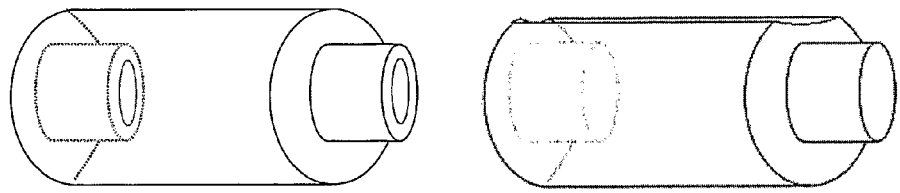
FIGS. 8a-8h demonstrate perspective views and cross sections of various ligament-segment configurations according to another embodiment of the present invention.
Figures 8C, 8D, 8E:
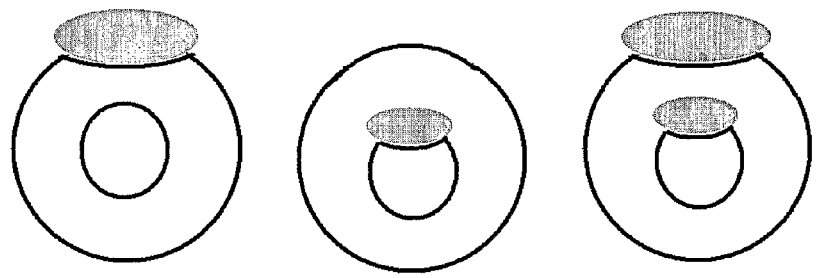
Figures 8F, 8G, 8H:
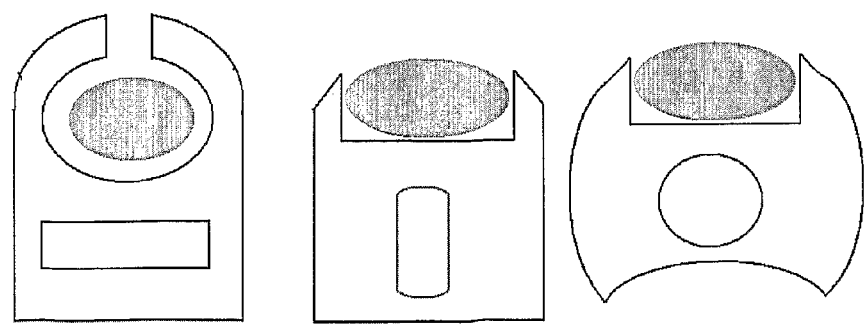

Reference is now made to FIGS. 8a-8h illustrating in an out-of-scale and non-limiting manner various possible embodiments of the invention. FIG. 10a shows a perspective view of a single (here, e.g., tubular shaped-) segment, adapted to accommodate a ligament within the outer shell of the segment. FIG. 8b depicts a perspective view of another single segment, adapted to accommodate a ligament outside (i.e., top crescent recess) the shell of the segment. FIG. 8c presents a cross section of the FIG. 8b embodiment. The gray section represents a ligament positioned outside the shell of the segment, in the well-defined outer top crescent recess. FIG. 8d presents another embodiment of the invention, namely the ligament (see gray section) positioned within the shell of the segment, in the well-defined inner positioned top crescent recess. According to this embodiment, a flexible ligament, if used, well accommodated within the secure boundaries of the segments, so that a dangerous backlash of the ligament is avoided. FIG. 10e presents a cross section a combine version of the SBC, wherein both inner and outer ligaments are utilized (e.g., a rigid external first ligament and flexible inner second ligament). The shape, size, cross section, and details of the at least a portion of the segments may vary, as defined in an illustrative manner in FIGS. 10f-10h.

Figure 9A:
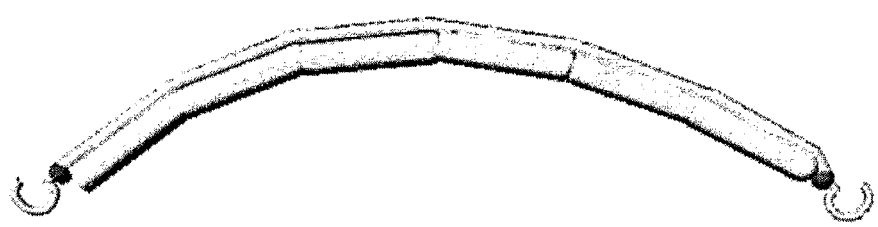
FIGS. 9a-9b demonstrate perspective views of cord-like and net-like SBCs with hooks as effective abutments according to another embodiment of the present invention.
Figure 9B:
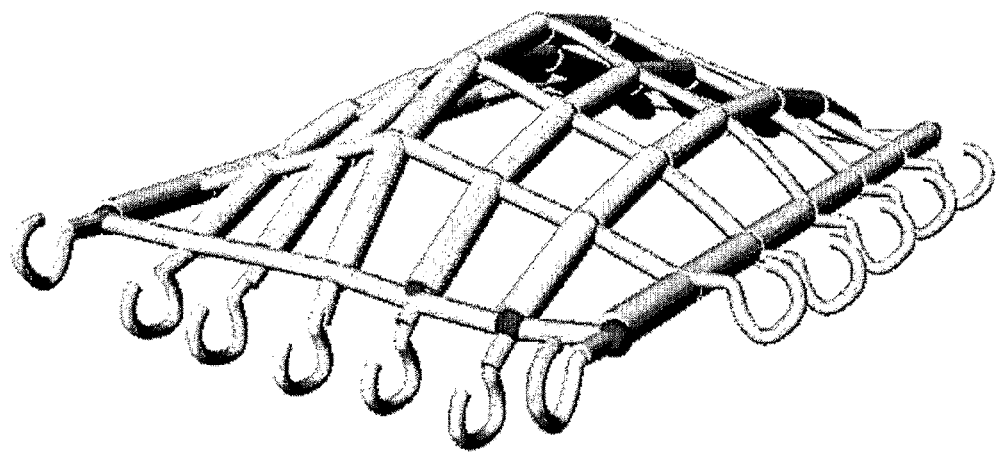

Reference is now made to FIGS. 9a-9b illustrating in an out-of-scale and non-limiting manner various possible embodiments of the invention, namely a linear cord-like structure and 2D net-like structure (FIG. 9a and FIG. 9b, respectively). Here, abutments of the arched SBC are hook-like members, adapted to reversibly anchor both opposite sides of the SBC and provides it secured arched configuration.

Figure 10:
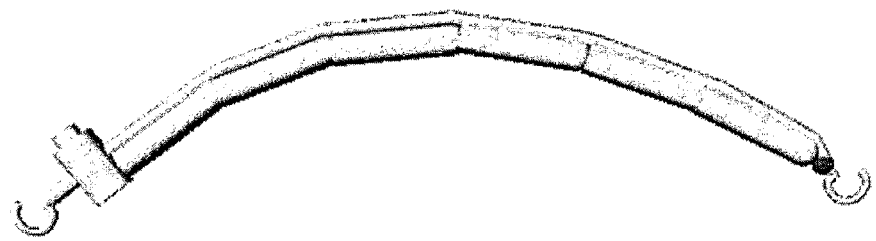
FIG. 10 demonstrates perspective view of cord-like SBCs with hooks, external ligament and ligament shortening means, according to yet another embodiment of the present invention.

Reference is now made to FIG. 10 disclosing in an out-of-scale and non-limiting manner another embodiment of the invention: the arched SBC comprises two hooks (abutments), shortanable segments-pressing ligament, positioned externally (top wise position) to the segments, and a simple to operate ligament-shortening means.

Figure 11:
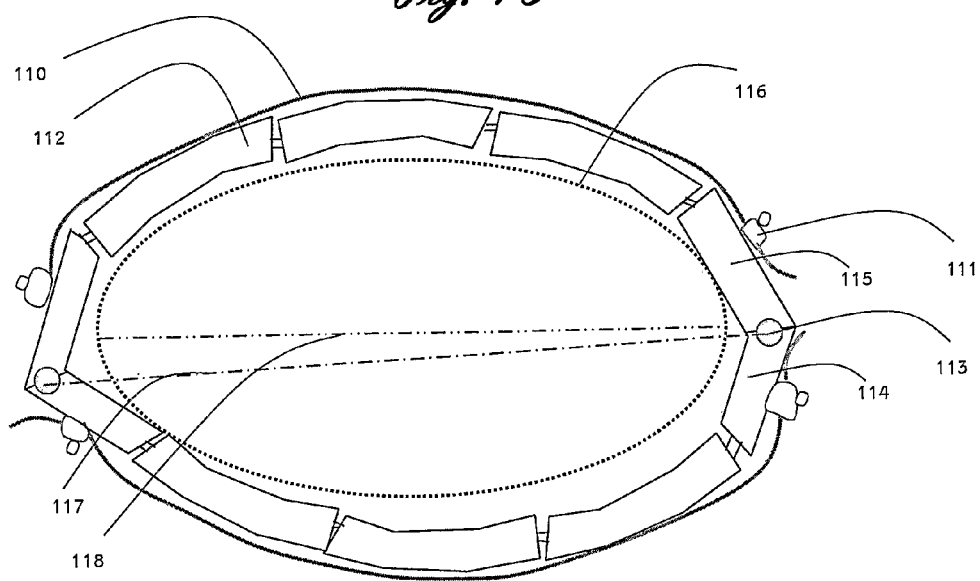
FIG. 11 demonstrates cross section of a 2D-SBC in its loose (or semi-rigid) configuration, according to yet another embodiment of the present invention.

Reference is lastly made to FIG. 11 disclosing in an out-of-scale and non-limiting manner a cross section of a 3D shell-like SBC according to an embodiment of the invention. The SBC of this example comprises two shortanable segments-pressing ligaments (See first ligament 110), which presses segments (see segments 112 at the top portion of the SBC). The ligament is positioned e.g., externally to the segments. A shortening mechanism 111 ensures ligament 110 to be is at least temporarily affixed at a defined measure of tightening to the SBC, all by a means of a simple to operate ligament-shortening member. The SBC of FIG. 11 discloses, inter alia, at least two segments, each of which comprises a hinge 113, in physical connection with at least two rotetable or otherwise maneuverable wings (115, 116). When the SBC is reconfigured from an initial loose state to a arched (tightened) state, the external ligaments, now in their shortened length, are pressing the segments. According to the basic principals of arched-bridges, the segments become close to each other (see final tightened contour of dashed line 116), and a close and secure structure is provided. In this embodiment, like many other 2D- and 3D-SBCs, abutments of at least one first SBC is provided as a basis or a ground to be stabilize upon to abutments of at least one second SBC. One can thus imagine hinges 113 are being common abutments to both upper SBC and lower SBC of FIG. 11.

FIG. 11 also shows the horizontally projected length of the SBC in its initial LOOSE configuration (dashed respectively long line 117) and TIGHTENED configuration (dashed short line 118). The secure tightened arch is provided at short horizontal-projected line.

It is well in the scope of the invention wherein ligaments are tightened in a scalable manner, i.e., in three or more degrees of tension: (i) Loose state, whereas the SBC is flexible and without a clear shape (ii) Semi-tightened state whereas the SBC is somewhat flexible and with a non-rigid defined shape, and (iii) Tightened arched state, whereas the SBC is not flexible and it is well characterized by a clear predetermined secure shape. According to this 'scaled' embodiment, ligament 110, shortening mechanism 111 etc are marked with indicia, indicating the Loose state, Semi-tightened and Tightened states of the SBC. Similarly, the scale may be a four-mode scale (e.g., Solid, Semi-Solid, Safe & Loose mode), ten-steps mode or any other scale or mode.

The invention claimed is:

1. A method for reversibly housing and securing goods to a predetermined location, said method comprising steps of:
   a. providing an elongated segmented binding cord with a main longitudinal axis; a plurality of interlockable segments; at least one ligament; and at least two abutments located at least one first end, and at least one second opposite end of said elongated segmented binding cord; each of said abutments is adapted to at least reversibly attach said predetermined location;
   b. attaching said at least two abutments to their location; and c. applying pressure upon the segments; at least two abutments provided at least one first end of said elongated segmented binding cord and at least one second opposite end of said elongated segmented binding cord, wherein by attaching said two abutments to their location, and providing said ligament to apply a pressure upon said segments, said elongated segmented binding cord is reversibly transformed from said LOOSE (non-arched) configuration to said TIGHTENED (arched) configuration, such that said goods are at least partially housed in a secured manner within said arched elongated segmented binding cord;

and further wherein said at least one ligament is positioned along the elongated segmented binding cord's main longitudinal axis and externally to at least one of said segments.

2. The method according to claim 1, further comprising steps of:
  a. interlocking a segment to at least one of the two adjacent segments
  b. threading a ligament through or along at least two of said segments;
  c. securing said elongated segmented binding cord structure to the predetermined location by means of effectively affixing said abutments to said location; and,
  d. shortening said ligament and thereby providing said ligament a predetermined amount of tension applied on said segments;
  wherein by attaching said two abutments to their location, and shortening said ligament, said elongated segmented binding cord is reversibly transformed from said LOOSE (non-arched) configuration to said TIGHTENED (arched) configuration, such that said goods are housed in a secured manner within said arched elongated segmented binding cord.

3. A method for reversibly housing and securing goods to a predetermined location by means of a two-dimensional elongated segmented binding cord; said method comprising steps of:
  a. providing a plurality of elongated segmented binding cords;
  b. for each of said plurality of said elongated segmented binding cords, interlocking a segment to least one of two adjacent segments; and threading a ligament through or along at least two of said segments; and further threading said ligament externally to at least one of said segments;
  c. conjugating at least one first elongated segmented binding cord with at least one second elongated segmented binding cord such as a 2D elongated segmented binding cord net-like loose structure is obtained;
  d. securing said loose 2D elongated segmented binding cord structure to said predetermined location by means of effectively affixing abutments to said location; and,
  e. shortening the ligaments and thereby providing said ligaments a predetermined amount of tension applied on said segments;
  wherein by attaching said abutments to their location, and shortening the ligament, said 2D elongated segmented binding cord is reversibly transformed from its LOOSE (non-arched) configuration to its TIGHTENED (arched) configuration, such that said goods are housed in a secured manner within the arched 2D net-like elongated segmented binding cord.

4. A method for reversibly encapsulating goods to a predetermined location by means of a three-dimensional elongated segmented binding cord, said method comprising steps of:
  a. providing a plurality of elongated segmented binding cords;
  b. for each of said plurality of elongated segmented binding cords, interlocking a segment to least one of two adjacent segments; and threading a ligament through or along at least two of said segments; and further threading said ligament externally to at least one of said segments;
  c. conjugating at least one first elongated segmented binding cord with at least one second elongated segmented binding cord; and optionally with at least one third elongated segmented binding cord, such as a 3D elongated segmented binding cord case-like loose structure is obtained;
  d. securing said loose 3D elongated segmented binding cord structure to the predetermined location by means of effectively affixing abutments to said location; and,
  e. shortening the ligaments and thereby providing said ligaments a predetermined amount of tension applied on said segments;
  wherein by attaching said abutments to their location, and shortening the ligament, said 3D SBC is reversibly transformed from its LOOSE (non-arched) configuration to its TIGHTENED (arched) configuration, such that said goods are housed in a secured manner within the arched 3D case-like elongated segmented binding cord.

* * * * *